(12) United States Patent
Ahmad et al.

(10) Patent No.: US 9,286,108 B2
(45) Date of Patent: Mar. 15, 2016

(54) METHOD TO TRACK APPLICATION CONTEXT AND APPLICATION IDENTIFICATION

(75) Inventors: Saqib Ahmad, San Jose, CA (US); Tanjore Ravishankar, Los Altos, CA (US); Thierry Violleau, Poissy (FR)

(73) Assignee: Oracle America, Inc., Redwood City, CA (US)

( * ) Notice: Subject to any disclaimer, the term of this patent is extended or adjusted under 35 U.S.C. 154(b) by 1404 days.

(21) Appl. No.: 12/261,800

(22) Filed: Oct. 30, 2008

(65) Prior Publication Data

US 2010/0115530 A1    May 6, 2010

(51) Int. Cl.
*G06F 9/46* (2006.01)
*H04W 4/00* (2009.01)
*H04W 4/20* (2009.01)

(52) U.S. Cl.
CPC ............... *G06F 9/461* (2013.01); *H04W 4/001* (2013.01); *H04W 4/20* (2013.01)

(58) Field of Classification Search
CPC ......... G06F 9/461; H04W 4/001; H04W 4/20
USPC ....................................................... 718/108
See application file for complete search history.

(56) References Cited

U.S. PATENT DOCUMENTS

| 5,157,777 A | * | 10/1992 | Lai et al. ....................... 711/202 |
| 6,058,457 A | * | 5/2000 | Tremblay et al. ............. 711/132 |
| 7,114,153 B2 | * | 9/2006 | Nijdam ............................. 718/1 |
| 2008/0168438 A1 | * | 7/2008 | Meijer et al. ..................... 718/1 |

* cited by examiner

*Primary Examiner* — Benjamin Geib
(74) *Attorney, Agent, or Firm* — Polsinelli PC

(57) ABSTRACT

One particular implementation may take the form of a system or method for tracking application identification and application context in a context-isolated computing environment. The method may store such application information to reduce redundant information being stored on a stack. More particularly, the embodiment may store the application information in a context-specific marker frame. The context-specific marker frame may be stored once on the stack or it may be stored separately from the stack to maintain a small stack size. In another implementation, an invocation handler method may be called to store the redundant information about the executing application. The invocation handler may store the necessary information in a well-known location for later use by the virtual machine. The invocation handler may also provide further benefits, such as synchronization to ensure thread safety on shareable objects.

14 Claims, 8 Drawing Sheets

METHOD TO TRACK APPLICATION CONTEXT AND APPLICATION IDENTIFICATION

FIELD OF THE INVENTION

Aspects of the present disclosure relate to managing computer program resources. More particularly, aspects may involve a method and apparatus for tracking application context and application identification in a resource constrained computing environment.

BACKGROUND

Stacks are often used in computer programs to keep track of information about routines that the computer program may execute. Such information may include a return address to mark the point where the active subroutine should return control when the subroutine finishes executing. Thus, when a function executes, the computer program may add some of the function's state data to the top of the stack for later retrieval. When the function completes its task, the computer program may remove the state data from the top of the stack and use that data to return the program to the correct executing point. By removing, or "popping", the return information off of the stack, the computer program may know where to return control once the subroutine is completed.

In most multithreaded computing systems, each thread may incorporate a stack to maintain information about the application running on the threads. Maintaining stacks for each thread may prevent multiple threads from accessing a application at one time, thereby possibly creating a conflict within the application. Thus, each thread may maintain information about the applications running on the threads as a check to maintain the integrity of each executing application.

As more and more subroutines of a computer program are processed on the threads of a multithreaded computing system, the information stored in a given stack may grow very large. Applications running on any given thread may ultimately call methods from several other applications, creating a long chain of information stored on a stack. However, in a resource constrained computer environment, available memory space is often very limited. Thus, stacks storing large amounts of information may unduly consume much of the valuable memory space of the computing environment.

SUMMARY

One embodiment may take the form of a method for managing application information. The method may comprise the operations of detecting a context switch in a context-isolated computing environment and storing context-specific information in a first known location in memory. The context-specific information may comprise the context of an executing application and a first application, where the first application is an application through which the context was entered. The method may further comprise storing application-specific information in a second known location in memory, with the application-specific information comprising information about the executing application on a processing thread.

Another embodiment may take the form of a method for managing a stack in a smart card computing system. The method may comprise receiving, from a first application executing in a first execution context, a request to communicate with a second application executing in a second execution context and creating a context-specific marker frame. The context-specific marker frame may be configured to store context-specific information about the request. The method may also comprise pushing the context-specific marker frame on the stack, creating a stack frame with the stack frame configured to store application-specific information about the second application and not context-specific information and pushing the stack frame on the stack on top of the context-specific marker frame.

Yet another embodiment may take the form of a method for reducing information stored on a stack of a context-isolated computing environment. The method may comprise the operations of detecting a context switch, accessing an invocation handler program and providing context-specific information to the invocation handler program. The invocation handler function may be configured to store the context-specific information in a known location in memory. The method may also include the operations of creating a stack frame, where the stack frame configured to store application-specific information and not context-specific information and pushing the stack frame on the stack.

Yet another embodiment may take the form of a system managing a stack. The system may comprise a machine-readable medium having stored thereon data representing sequences of instructions that, when executed by a processor, cause the processor to perform operations comprising detecting a context switch in a context-isolated computing environment, pushing a context-specific marker frame on the stack, with the context-specific marker frame including context-specific information of an executing application and pushing a stack frame on the stack. The stack frame may include application-specific information and not context specific information.

DETAILED DESCRIPTION

One particular implementation of the present disclosure may take the form of a method for tracking application identification and application context in a context-isolated computing environment. As described further below, a context-isolated computing environment is a computing environment where applications are maintained separately in contexts. The method may store the application information to reduce redundant, context-specific information from being stored on a stack.

More particularly, one method for tracking application identification and application context in a context-isolated computing environment may take the form of creating a context-specific marker frame that may store the application information. The context-specific marker frame may store the application information such that the information may not need to be stored on the stack multiple times. Instead, the application information may be stored once within the context-specific marker frame and accessed by a computer program when needed. The context-specific marker frame may be pushed onto a stack of the computer program or it may be stored separately from the stack to maintain a small stack size.

Another implementation may include a method for tracking application identification and application context in a context-isolated computing environment by calling an invocation handler method to store context specific information about the executing application. The invocation handler may be a method that is called by the computer program when the application performs a context switch. The invocation handler may store the necessary information in a well-known location for later use by the computer program. Further, as described in more detail below, the invocation handler may also provide other benefits to the program, such as synchronization between applications to ensure thread safety in multithreaded computing environments.

Figure 1:
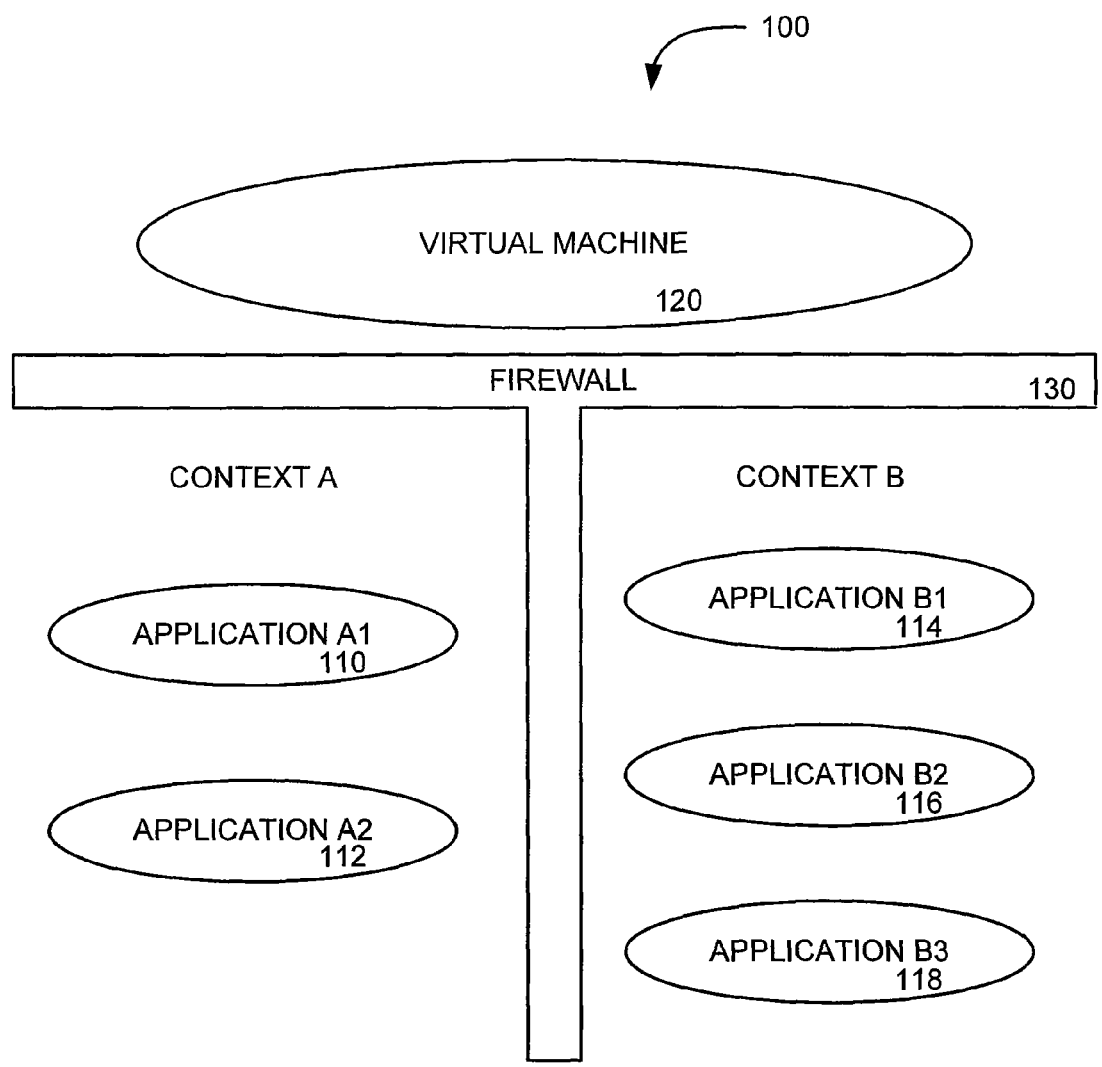
FIG. 1 is a diagram illustrating a context isolation scheme within a computing environment.

FIG. 1 is a diagram illustrating a context isolation scheme within a computing environment 100. The computing environment 100 may contain several applications 110-118 that may be run by a virtual machine 120. A virtual machine 120 is a software implementation of a computer that executes applications like a computer. Thus, the virtual machine 120 may execute the applications of FIG. 1. Further, as described in more detail below, the various applications 110-118 may be grouped into contexts such that applications within a single context may restrict access to those applications by applications of other contexts.

Many computer programs have multiple applications 110-118 that may need to interact with each other to perform the functions of the program. For example, a first application may require data that is stored by a second application. The first application may then call a function of the second application to retrieve the required data. However, in some computing environments, it may be desired to control access between applications. To maintain security between the multiple applications 110-118, some mechanism is generally needed to protect the applications while still allowing the applications to interact with each other. One possible protection mechanism is to bundle applications in their own execution context. This technique is often referred to as "context isolation." Context isolation means that a first application 110 cannot access protected resources of a second application 114 in another execution context unless the second application provides an interface for access to the protected resources. In essence, the context isolation may create a context firewall 130 around each context to prevent unauthorized access between contexts.

Each context within a computing environment 100 may contain one or more applications 110-118. The applications 110-118 associated with each context may be configured such that the applications may communicate freely. For example, application A1 and application A2 within context A may be configured to share information between the applications. However, applications located within a different context are generally not available for access by the applications in context A. Thus, the applications B1-B3 located in context B may not be available for access by the applications located in context A. As a result, a context firewall 130 scheme may provide context isolation to separate and remain secure the applications and information within each context.

However, in certain circumstances, the context firewall 130 may be configured to allow access to applications between contexts. For example, the context firewall 130 may be configured to allow application A1 to access application B1 of context B. When applications access other applications or information in a separate context, it is known as context switching. Each context within the computing environment 100 may accept requests to the information stored within the context. In response to the request, each context may allow certain applications outside of the context to access the information. For example, in a Java-based environment, a virtual machine (VM) may create a shareable interface object (SIO) when a request for information is made between contexts. Through the SIO, each context may control which applications have access to the applications within that context. Thus, a SIO for context B may be created when application A1 attempts to access information or an application located in context B. The SIO may determine which information application A1 is trying to access in context B and may deny or allow application A1 to have access. Through the SIO, access to applications within a context may be controlled by the VM. While the example given demonstrates a context-isolated environment in a Java-based computing environment, the techniques described may be implemented by any type of computer language.

Smart cards are one example of a computing environment 100 that may implement context isolation to control access to an application by another application in a different execution context. Smart cards are typically wallet-sized or smaller devices with embedded integrated circuits. A smart card typically comprises a processor and a memory and may be used to store a variety of user information, including but not limited to, credit card information, cellular phone information and an automated teller machine (ATM) card information.

A smart card may be configured to store several applets or servlets to perform calculations or to store sensitive information. The applets or servlets may be separated on the smart card such that an application in one applet may not have access to the information stored by other applets. For example, a smart card may be configured to store a user's credit card information. However, such information should be kept secure within the smart card. Thus, the applet containing the user's credit card should not be directly accessible by the other applets on the smart card. To provide this security feature, a smart card may implement the firewall/context isolation scheme described above. The firewall may assign a context to each applet on the card, thereby isolating the applications within each applet. For example, the applet containing the user's credit card information may be stored on the smart card as context A. Application A1 and application A2 may be applications that are controlled by the credit card company. These applications may have unfettered access to the user's credit card information. However, other applets on the smart card may be restricted in their access to the information stored in context A. Such information may be kept secure within the smart card by configuring the credit card applet to a context. The context firewall 130 may then protect the information of context A from access by other applets on the card. Therefore, through the context isolation scheme described, a context containing the user's credit card information may control which applets on the smart card have access to the secure information within the credit card context.

Figure 2:
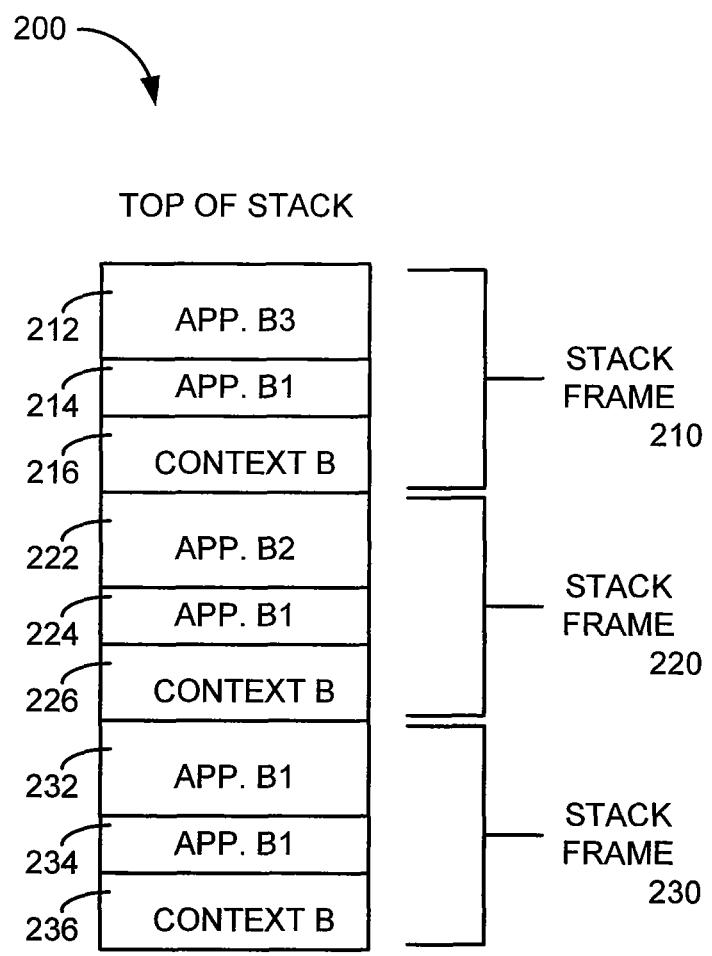
FIG. 2 is a diagram illustrating an exemplary stack within a computer program to store information about applications executing on a thread.

FIG. 2 is a diagram illustrating an example of a stack within a computer program to store information about applications executing on a thread. As described above, stacks are often used in computer programs to keep track of information about applications that are running on a thread. A computer program may use the information stored on the stack to allow an application to return to a previous location when a subroutine has finished executing. In multi-threaded computing environments, the stack may store information to ensure that only a single application may access each thread at any given moment. In context-isolated computing environments, other context-specific information may also be stored on the stack to maintain information on the currently executing application on a thread.

The stack 200 of FIG. 2 may store information about applications running on a thread in a context-isolated computing environment. Information may be stored on the stack 200 in sections referred to as stack frames. A stack frame may contain information that may be utilized by a VM when performing certain functions, such as during transactions and in restoring the VM state when returning from a method. The information stored on the stack may include, but is not limited to, the current program counter, information about the current java method, information about the firewall context, the currently executing application and information on the previous stack frames. Each stack frame may include a pointer to memory of the location of the stored information. Alternatively, the stack 200 may be one contiguous group of memory locations, with each stack frame storing information sequential within the memory group.

In one embodiment, the stack frame may include information about the currently executing application on the thread. The stack frame may also include information about which application a context was entered and the context to which the currently executing application belongs. For example, stack frame 210 may store information about an executing application 202 on the thread. In this example, application B3 is the currently executing application 202. The stack frame 210 may also store information on which application a context was entered 214. The application in which a context was entered may be the application that was first called within a context. In this example, application B1 was the first application that was called within context B. Thus, stack frame 210 may include information that indicates that application B1 was the application through which context B was entered 214. Finally, stack frame 210 may also store information on which application is currently executing on the thread 216. In this example, the current context executing on the thread is associated with context B. The information stored on the stack 200 in the stack frames may be used by the computer program to manage several executing applications on several processor threads. Further, it should be appreciated that the above examples are just some possible types of information that may be stored on a stack 200 in a stack frame. Any information that may be needed by the computer program may be stored on the stack 200 in stack frames for later use by the computer program.

Further, during execution, an application may call objects or routines of other applications. The stack 200 may be used to store information for these other applications that may be called by the computer program. For example, application B1 may call an object of application B2 to perform a function for B1. When an application calls an object of another application, a stack frame containing information about the newly called application may be pushed onto the top of the stack 200. In the stack 200 depicted in FIG. 2, several applications have been called. Beginning near the bottom of the stack, stack frame 230 contains information for application B1 that may be executing on a thread. Further, stack frame 230 indicates that application B1 may be the application that was first called within context B. Thus, stack frame 230 includes the executing application as application B1 (232), the application through which the context was entered as application B1 (234), and the context to which the executing application belongs as context B (236). At some later time, application B1 may call an object of application B2. Thus, a stack frame 220 containing information about application B2 may be created and pushed onto the stack 200 by the VM. Stack frame 220 may thus include the executing application as application B2 (222), the application through which the context was entered remains as application B1 (224), and the context to which the executing application belongs as context B (226). Because context B was first entered through application B1 (as indicated in each stack frame), this information may be stored in position 224 of stack frame 220. Further, at an even later time, application B2 may call an object of application B3. Thus, a stack frame 210 containing information about application B3 may be created and pushed onto the stack. Stack frame 210 may thus include the executing application as application B3 (212), the application through which the context was entered remains as application B1 (214), and the context to which the executing application belongs as context B (216). This process may continue as applications call objects or subroutines of other applications.

All of the information pushed onto the stack 200 by the computer program may be used to return to a previous position when an object of an application is no longer needed. Thus, after the object of application B3 completes its task, stack frame 210 may be popped off the of the stack 200 and the information stored may be used to return to application B2 so that application B2 may continue executing. By pushing stack frames onto the stack and popping them off when needed, the computer program may track which application is currently executing, as well as where the computer program needs to return when the current application is completed.

Figure 3:
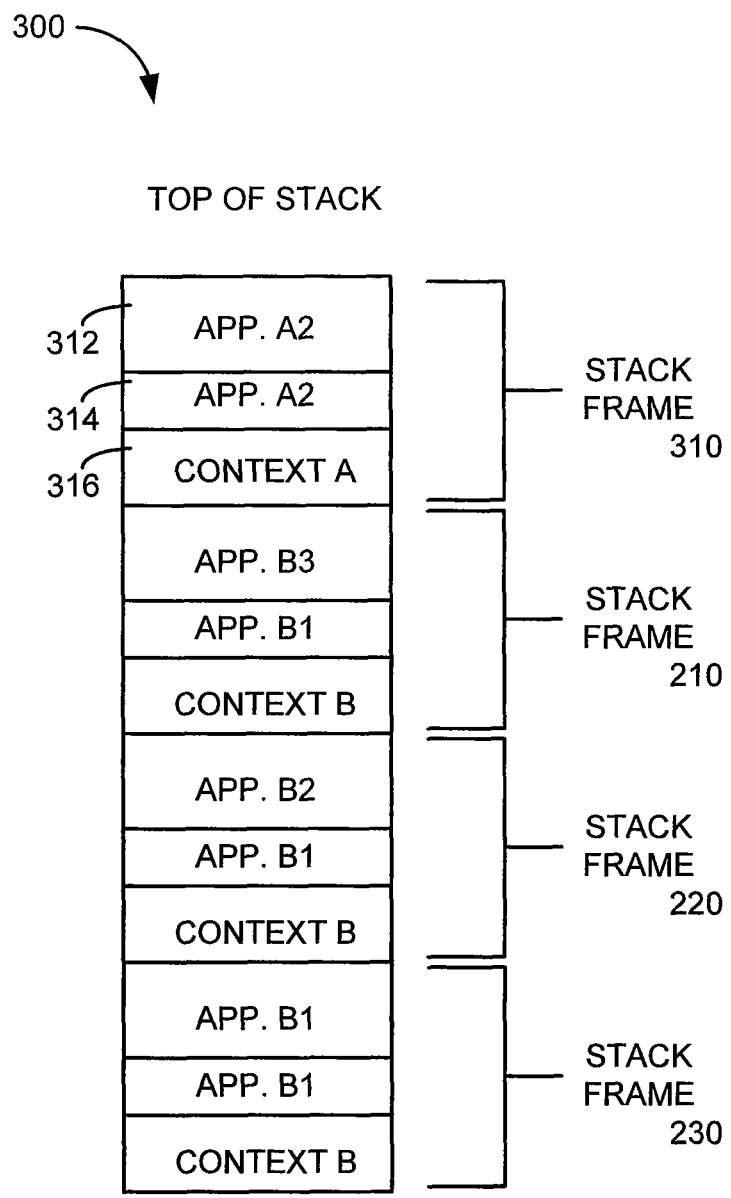
FIG. 3 is a diagram illustrating a stack within a context-isolated computing environment to store information about applications executing on a thread.

FIG. 3 is a diagram illustrating a stack within a context-isolated computing environment to store information about applications executing on a thread. In this example, stack 300 contains the same information for applications B1 through B3 as described above with reference to FIG. 2. Continuing the example, however, application B3 may call an object or subroutine of application A2. However, application A2 may be in a different context than application B3. Thus, the computer program may perform a context switch from context B to context A to allow application B3 to access application A2. The context switch may require application B3 to access A2 through a firewall protection scheme. If the firewall allows application B3 to access application A2, the computer program may push a new stack frame 310 onto the stack 300 of the thread. This stack frame 310 may contain information about the newly called object of application A2. For example, the stack frame may include information on the executing application 312. This information may indicate that the currently executing application is application A2. The stack frame 310 may also store information about which application a context was entered 214. In this example, context A was accessed through application A2. Thus, the stack frame 310 may indicate that context A was entered through application A2. Finally the stack frame may include information about the context to which the currently executing application belongs 316. In this example, the current context is context A. Thus, the stack 300 maintained by the computer program may include stack frames for context switches such that the computer program may use the information to manage the executing applications.

As should be appreciated, the stacks that may be maintained by a computer program may consume a significant amount of memory space. Complex applications may call objects of several other applications that may in turn call objects of other applications. Thus, the stacks of a computer program may quickly grow to a very large size and consume a large amount of the memory. Further, as can be seen from the stacks of FIG. 2 and FIG. 3, most of the information that may be stored in the stacks may be redundant information, or similar information that is stored in each stack frame. Each instance of the redundant information may require memory to store the information.

Figure 4:
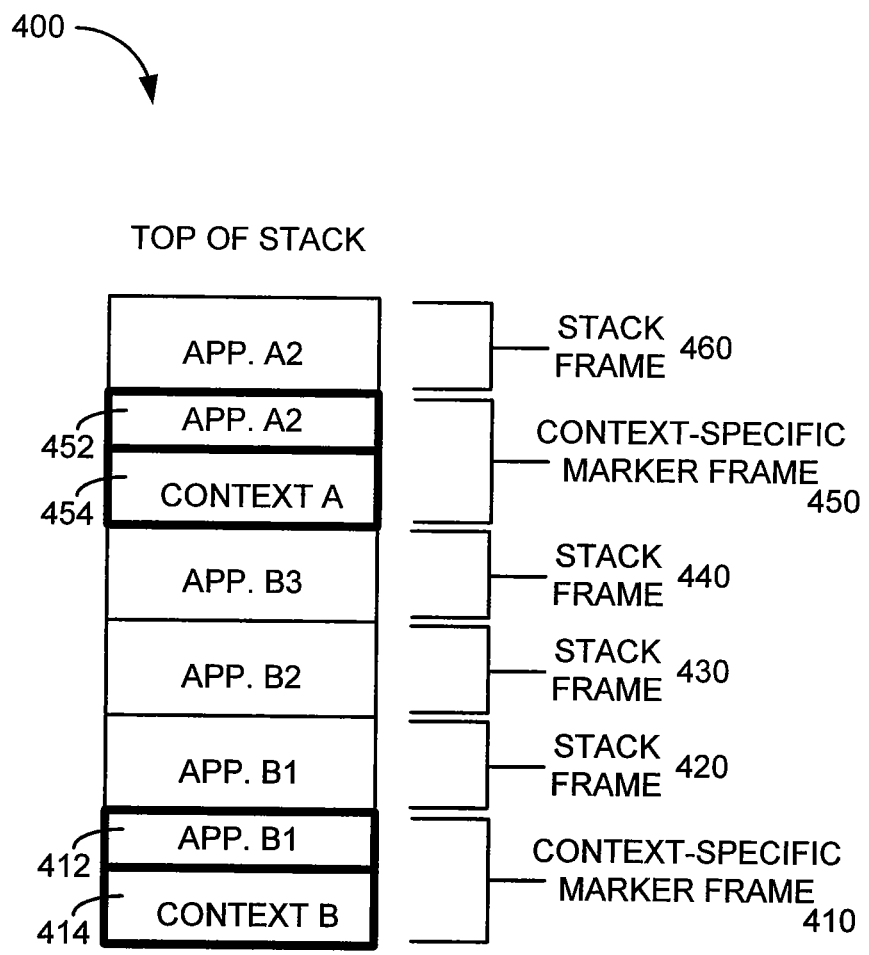
FIG. 4 is a diagram illustrating pushing context-specific marker frames onto a stack within a context-isolated computing environment to store redundant information on the stack.

FIG. 4 is a diagram illustrating pushing context-specific marker frames onto a stack within a context-isolated computing environment to store redundant information on the stack. The stack 400 of FIG. 4 contains the same information and follows the same series of application calls as depicted in the stack of FIG. 3. However, this stack 400 may include context-specific marker frames that may store context-specific information. The context-specific marker frames may be used to store information that may be stored on the stack redundantly. Thus, through the use of context-specific marker frames, the amount of information stored on the stack 400 may be reduced, thereby consuming less memory to store the stack 400. It should be appreciated that any type of information that may be redundantly stored on a stack may be stored in a context-specific stack frame to reduce the memory consumption of the stack.

As can be seen from the stack 300 of FIG. 3, the application through which a context was entered and the context to which an executing application belongs may be stored in each stack frame. However, if a series of application calls remain in the same context, this information may be repeatedly stored in each stack frame. Thus, stack frames 310-330 each store the same information that the application through which the context was entered is application B1 and the context in which the executing application belongs is context B. In FIG. 4, this same information may be stored in a context-specific marker frame 410 that may be stored on the stack 400 once, thereby reducing the amount of information that is ultimately stored on the stack.

Stepping through the same series of application calls as used in FIG. 3, a first context-specific marker frame 410 may be created when an application enters a context or performs a context switch and stored on the stack 400. In this example, the computer program may call application B1. A context-specific marker frame 410 may be created that stores the information that the application through which the context was entered 412 is application B1 and the context in which the executing applications belong 414 is context B. After the context-specific marker frame 410 is stored on the stack 400, a normal stack frame 420 may be pushed on the stack above the context-specific marker frame (ie. may occupy a memory location following the memory location of the context-specific marker frame). The normal stack frame 420 may include information about the currently executing application on the thread. However, because the context-specific marker frame 410 may store the redundant information, the normal stack frame 420 may rely on the context-specific marker frame to store such information. Instead, the normal stack frame 420 may only store information about the currently executing application, thereby reducing the amount of information stored by the normal stack frame.

Application B1 may then call an object of application B2. Thus, information about the new application call may be stored on the stack 400 in a normal stack frame 430. However, because the context-specific marker frame 410 stores which application the context was entered through and the context in which the executing application belongs, this information need not be stored again by the normal stack frame 430. Thus, the normal stack frame 430 for the call to application B2 may just store information about application B2. In a similar manner, application B2 may then call an object of application B3. A normal stack frame 440 may be pushed onto the stack 400 including information about application B3. However, by using the context-specific marker frame 410, the amount of information needed to be stored to track this series of application calls is reduced.

Similar to the stack illustrated in FIG. 3, the stack illustrated in FIG. 4 may perform a context switch. In this example, application B3 may call an object of application A2, thereby performing a context switch. The computer program may detect that a context switch is requested and create a context-specific marker frame 450 to put onto the stack 400. The context-specific marker frame 450 may store the information that the application through which the current context was entered 452 is application A2 and that the context in which the executing applications belong 454 is context A. After the context-specific marker frame 450 is pushed onto the stack 400, a normal stack frame 460 may be pushed on the stack including information about the currently executing application. This process may continue as applications are executed on the thread.

To retrieve the information from a stack containing context-specific marker frames, the computer program may pop the stack frames off of the top of the stack, as described above. However, when a context-specific marker frame is encountered on the stack, the computer program may pop the context-specific marker frame from the stack and process the information accordingly. After processing the information, the computer program may then automatically pop the next stack frame from the stack to determine which application the program should return. In another embodiment, the context-specific marker frame may include a bit flag that indicates to the computer program that the frame is a context-specific marker frame. The computer program may use the bit flag to scan a stack containing context-specific marker frames to determine where a context-specific marker frame is located on the stack. For example, in some circumstances, the computer program may require the information stored in stack without popping the stack frames off of the stack, such as to perform security checks at runtime. The computer program may then scan the stack in search of the necessary information. Each stack frame may include a pointer to the frame below it in the stack. Thus, the computer program may analyze the stack, following the pointers down the stack, searching the bit flag of the context-specific marker frame. Once the bit flag of the context-specific marker frame is found, the computer program may then analyze the information stored in the context-specific marker frame without popping each stack frame located on the stack above the context-specific marker frame. In this manner, the computer program may use a stack 400 containing context-specific marker frames as if the stack includes the redundant information in each stack frame. However, the stack 400 containing context-specific marker frames may consume less memory to store the information, as redundant is eliminated from the stack.

Figure 5:
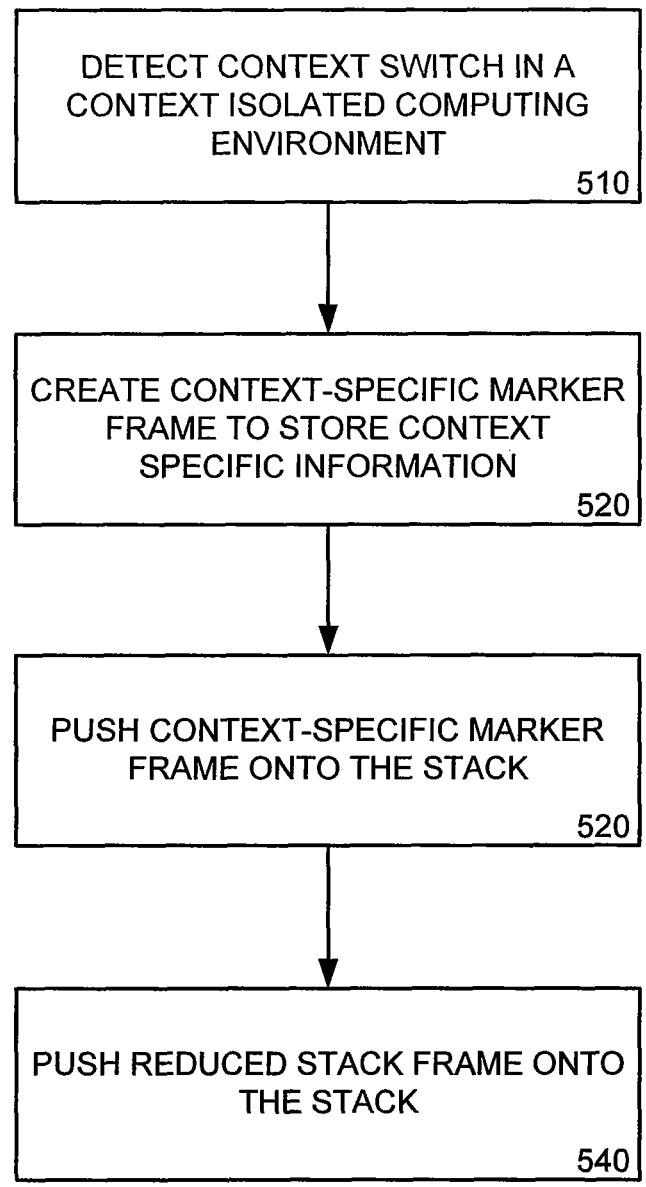
FIG. 5 is a flow chart depicting a computer program creating a context-specific marker frame to store redundant information on a stack.

FIG. 5 is a flow chart depicting a computer program creating a context-specific marker frame to store redundant information on a stack. The context-specific marker frame may be used to store the redundant information such that the computer program may access the information when needed. The context-specific marker frame may also reduce the memory consumption needed to store the information contained within the stack.

The embodiment may begin in operation 510 when the computer program detects a context switch. As described above, a context switch may occur when an application executing on a thread calls an object or subroutine of another application included in another context. Generally, an application of a context is not allowed to access objects of an application of another context. However, is some circumstances, access to objects within a context is granted to an application of a different context. In this situation, a context switch occurs.

Once a context switch is detected, the computer program may create a context-specific marker frame in operation 520. The context-specific marker frame that is created may include information that may be stored on the stack redundantly. As described above, the context-specific marker frame may include context specific redundant information, such as which application was first accessed when entering a context and to which context the application belongs. However, other redundant information may also be stored in the context-specific marker frame. Generally, any information that may be redundantly stored on a stack of a thread may be stored in the context-specific marker frame by the program.

After the context-specific marker frame is created in operation 520, the computer program may push the context-specific marker frame onto the stack in operation 530. Once on the stack, the computer program may access the context-specific marker frame by popping the context-specific marker frame off of the stack. However, the program may also need to pop each stack frame located above the context-specific marker frame on the stack before having access to the context-specific marker frame. Alternatively, the context-specific stack frame may contain a bit flag that may be recognized by the computer program. The bit flag may allow the computer program to scan the stack to locate the context-specific marker frame, if the information stored in the context-specific marker frame is needed without disturbing the other stack frames located on the stack.

Once the context-specific marker frame is pushed onto the stack, a reduced stack frame containing information about the specific application that is called may be pushed on the stack on top of the context-specific marker frame in operation 540. The reduced stack frame may also include any information that is not generally stored on the stack in a context-specific marker frame. Through this, the redundant information that may be stored on the stack may be stored once in a context-specific marker frame, while the non-redundant information may be stored individually. This construction of the stack may reduce the overall memory consumption of the stack to store the information. Such a configuration of the stack may be desirable in a resource-constrained computing environment.

Figure 6:
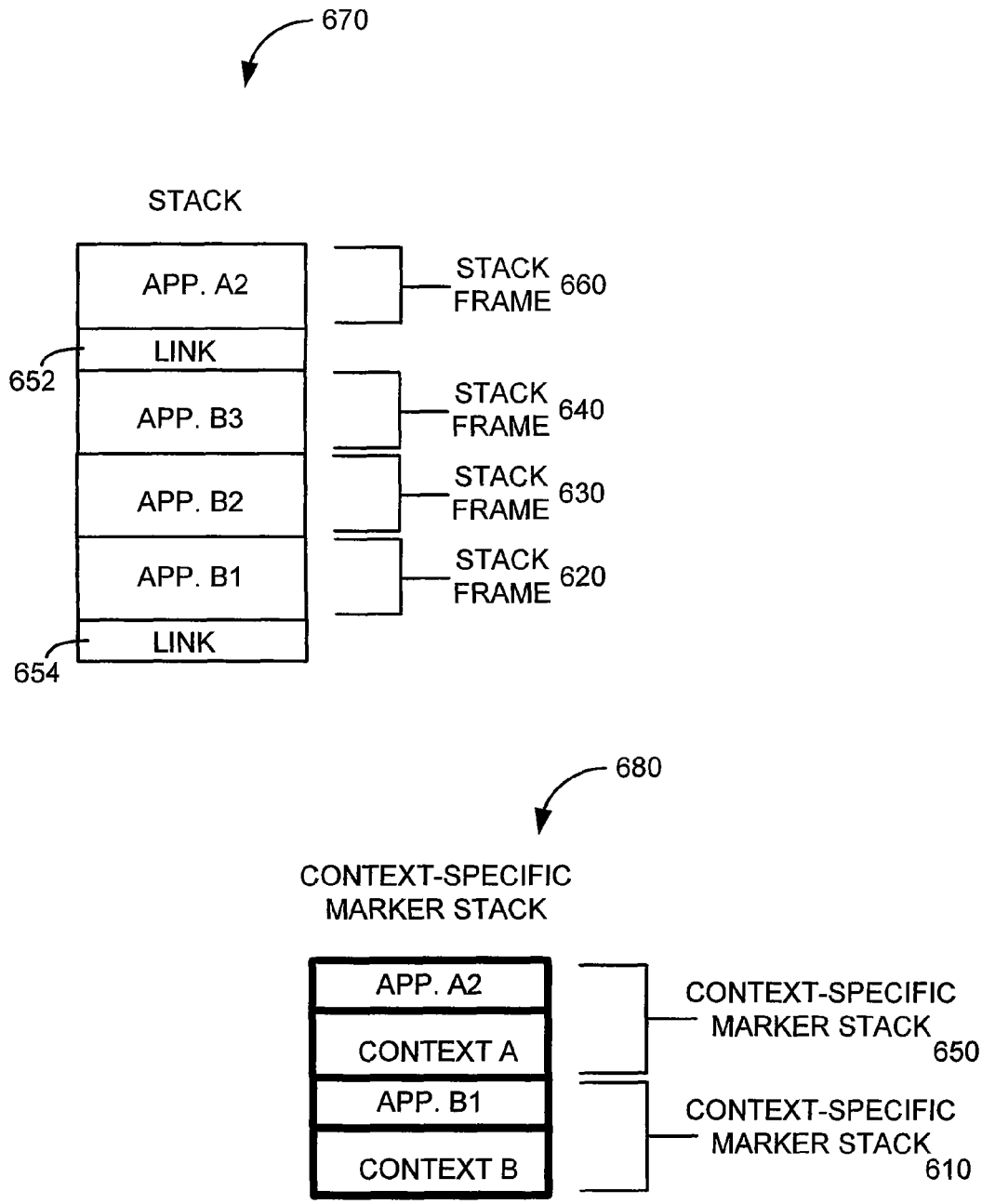
FIG. 6 is a diagram illustrating an embodiment of the present disclosure of maintaining a separate context-specific stack for storing context-specific marker frames within a context-isolated computing environment to store redundant information on a stack.

FIG. 6 is a diagram illustrating one embodiment of the present disclosure of maintaining a separate context-specific stack for storing context-specific marker frames within a context-isolated computing environment to store redundant information on a stack. The stacks shown in FIG. 6 represent the same series of calls as illustrated in FIGS. 3 and 4. However, in this embodiment, the context-specific marker frames may not be stored on the stack 670 at all. Instead, a separate context-specific marker stack 680 may be created by the computer program to store the context-specific marker frames that are created. When the computer program needs the information stored in a context-specific stack frame 650, the computer program may access the separate context-specific marker stack 680 to get the information, rather than popping the context-specific marker frame off the stack 670. The stack 670 and the context-specific marker stack 680 may be linked in such a way that the computer program may know when to access the context-specific marker stack. For example, as the computer program is popping information off of the stack 670, a link (652, 654) may be located on the stack to instruct the computer program to pop the first context-specific marker frame 650 off of the context-specific marker stack 680. In other words, the link (652,654) of the stack 670 may point to the context-specific marker stack 680 such that the application may follow the link to the context-specific marker stack 680 to retrieve the context-specific information. The computer program may then pop the context-specific marker frame 650 that is on top of the context-specific marker stack 680 and process the stored information. Thus, each stack 670 may be linked (652,654) to the context-specific marker stack 680 containing context-specific marker frames so that the computer program knows when to access the context-specific marker frame on the separate context-specific marker stack.

Figure 7:
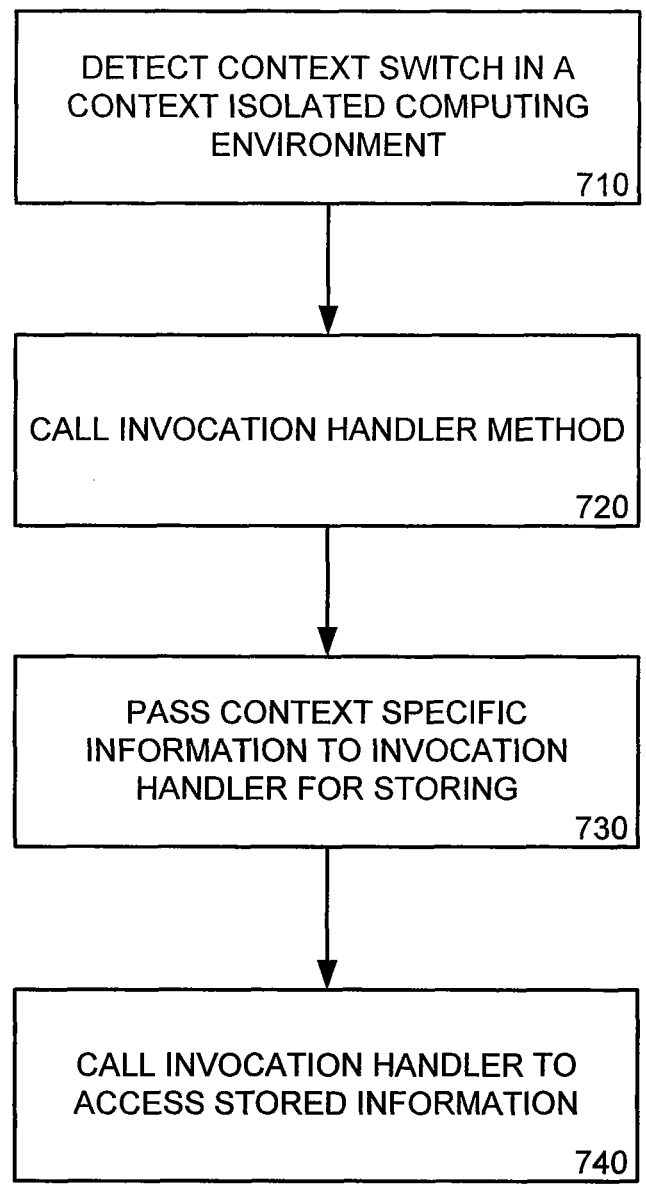
FIG. 7 is a flow chart depicting a computer program creating an invocation handler to manage redundant information of the executing application stored on a stack.

FIG. 7 is a flow chart depicting a computer program creating an invocation handler to manage redundant information of an executing application stored on a stack. As with the context-specific marker frame described above, the invocation handler may be used to store redundant information that may be stored on a stack such that the computer program may access the information when needed. By storing redundant information once, the invocation handler may also reduce the memory consumption of storing the information on a normal stack.

This embodiment may begin in operation 710 when the computer program detects a context switch in a similar manner as described above with reference to the flow chart of FIG. 5. Once the context switch is detected, the computer program may call an invocation handler method in operation 720. The invocation handler may be a method or function called by the computer program when a context switch is detected.

In operation 730, the computer program may pass on the information that is to be stored by the invocation handler. Such information may include which application is first accessed in a context and the context that an executing application belongs to. Other information that may be redundantly stored on a stack may also be passed to the invocation handler. The invocation handler may receive the redundant information from the computer program and may save the information in a well known location for later retrieval by the computer program. Because the invocation handler stores the redundant information, such information need not be stored on the stack. Thus, less information may be stored on the stack and less memory may be consumed by information stored on the stack.

In operation 740, the computer program may call the invocation handler to retrieve the stored information when such information is needed. By storing the information with an invocation handler, the computer program is not required to go up the stack looking for the information. Instead, the computer program may just call the invocation handler method to retrieve the needed information. Thus, such information may remain stored separately from the stack such that the information is not being stored redundantly.

The invocation handler may also be used with a stack to store the application information. For example, similar to the stack configuration described in FIG. 6, a stack may be created to store application information. The stack may also contain stack frames that do not store application information. Instead, the non-content stack frames may instruct the computer program to call the invocation handler. When the computer program may be returning from a context, the program may access the stack to retrieve the application information. When a non-content stack frame is encountered, the computer program may call the invocation handler to retrieve the context-specific information that may be stored in the global location in memory. In this manner, the invocation handler may be utilized by a computer program to interact with a stack to store information that may be needed by the program, while reducing the instances of redundant information being stored on the stack.

The invocation handler may also offer additional benefits to a computer program. Because the invocation handler is being called at a program level, rather than at a virtual machine level, the added method called during a context switch may provide additional benefits for the program. Particularly, the invocation handler method may assist in multi-threaded computing environments. For example, in a context-isolated environment using multiple processing threads, it is important to maintain context separation. By interposing the invocation handler method into each context switch, added functionality may be added to the context switch to ensure separation of the threads. One such functionality may be additional security checks between the contexts to ensure that multiple threads do not access the same application at the same time.

Another security measure may assist applications that are developed for single-threaded environments to run on multi-threaded processors. Applications developed for a single-threaded environment may not have internal safeguards to protect against multiple applications accessing the application at the same time. The invocation handler method may provide an additional safeguard to a single-threaded application from being improperly accessed by multiple threads. For example, the invocation handler may ensure that there is no other thread executing the application when the invocation handler is called. If another application is executing the application, the invocation handler may delay the call to the application until the current thread has released the application. In this manner, the invocation handler may synchronize the single-threaded application for the multi-threaded environment.

Further, once the invocation handler method is interposed within the context switch, functionality that may be desired in the future may be introduced to the context switch without significant changes to the computer program. Instead, the added functionality may be added directly into the invocation handler. For example, code may be added to the invocation handler method to perform a logging function for a particular context or application. Thus, because the invocation handler is called for each context switch, additional functionality may be inserted into the invocation handler and performed when the invocation handler is called by the computer program at a context switch.

Figure 8:
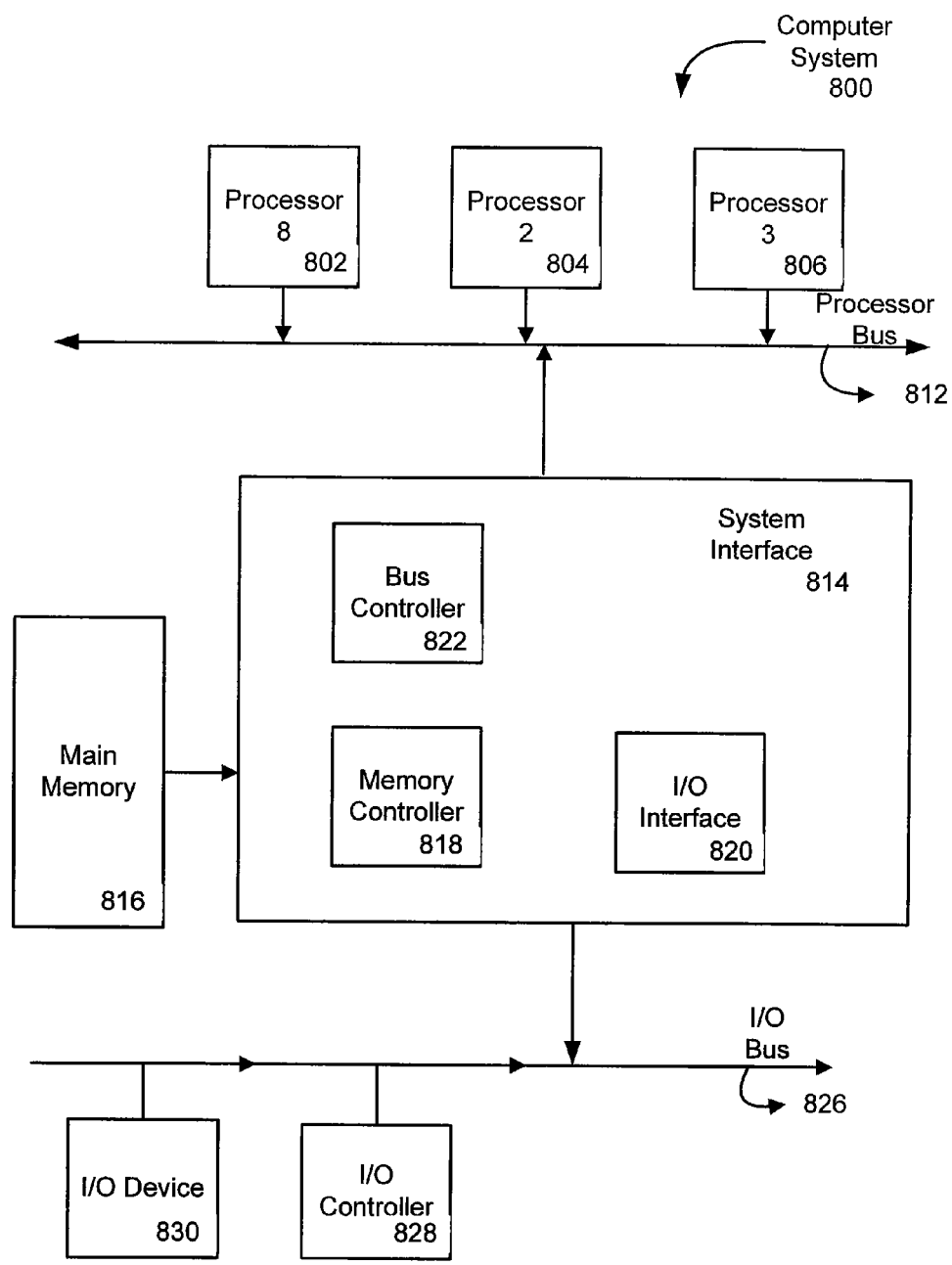
FIG. 8 is a block diagram illustrating an exemplary computer system which may be used in implementing embodiments of the present disclosure.

FIG. 8 is a block diagram illustrating an example of a computer system 800 which may be used in implementing embodiments of the present invention. The computer system (system) includes one or more processors 802-806. Processors 802-806 may include one or more internal levels of cache (not shown) and a bus controller or bus interface unit to direct interaction with the processor bus 812. Processor bus 812, also known as the host bus or the front side bus, may be used to couple the processors 802-806 with the system interface 814. System interface 814 may be connected to the processor bus 812 to interface other components of the system 800 with the processor bus 812. For example, system interface 814 may include a memory controller 818 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. One or more I/O controllers and/or I/O devices may be connected with the I/O bus 826, such as I/O controller 828 and I/O device 830, as illustrated.

I/O device 830 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system set forth in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 816. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowcharts of FIGS. 5 and 7 are illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for managing application information comprising:
    detecting a context switch in a context-isolated computing environment;
    storing a particular context-specific information in a first stack only when the context switch is detected, the first stack configured to store a plurality of context-specific information, the particular context-specific information comprising an indicator of a first application and a context of an executing application, wherein the first application is an application through which the context of the executing application was entered;
    storing a particular link to the particular context-specific information in a second stack, the second stack different than the first stack and configured to store a plurality of links to the context-specific information of the first stack, each of the plurality of links to the context-specific information comprising a pointer to at least one of the plurality of the context-specific information stored on the first stack; and
    storing an application-specific information in the second stack, the application-specific information comprising information about the executing application on a processing thread.

2. The method of claim 1 wherein the storing the particular context-specific information operation further comprises:
    creating a context-specific marker frame to store the particular context-specific information; and
    pushing the context-specific marker frame onto the first stack, the first stack configured to maintain information about applications executing in the computing environment.

3. The method of claim 1 wherein the storing the particular context-specific information operation further comprises:
    accessing an invocation handler function, and
    providing the particular context-specific information to the invocation handler function, wherein the invocation handler function is configured to store the particular context-specific information in the stack.

4. The method of claim 1 wherein the context-isolated computing environment is supported within a smart card computing system.

5. A method for managing a smart card computing system, comprising:
    receiving, from a first application executing in a first execution context, a request to communicate with a second application executing in a second execution context;
    creating a particular context-specific marker frame only when the request to communicate with the second application executing in the second execution context is received from the first application executing in a first execution context, the particular context-specific marker frame configured to store context-specific information comprising an identification of the second execution context and an identification of the second application executing in the second execution context;
    pushing the particular context-specific marker frame on a first stack configured to store a plurality of context-specific marker frames;
    creating a particular link to the particular context-specific marker frame in a second stack, the second stack different than the first stack and configured to store a plurality of links, each of the plurality of links comprising a pointer to at least one of the plurality of context-specific marker frames of the first stack, the particular link to the particular context-specific marker frame comprising a pointer to the particular context-specific marker frame stored on the first stack;
    creating a stack frame, the stack frame configured to store application-specific information about the second application and not context-specific information; and
    pushing the stack frame on the second stack.

6. The method of claim 5, wherein the context-specific marker frame further comprises a bit flag, the method further comprising: setting the bit flag when the particular context-specific marker frame is created.

7. The method of claim 6, further comprising:
    searching the first stack to locate the bit flag of the particular context-specific marker frame; and
    analyzing the particular context-specific information included in the context-specific marker frame when the bit flag is detected.

8. The method of claim 5, further comprising:
    popping the stack frame off of the second stack;
    analyzing the application-specific information about the second application;
    after popping the stack frame off of the second stack, popping the particular context-specific marker frame off of the first stack; and
    analyzing the context-specific information.

9. A system for managing a stack comprising:
    a non-transitory machine-readable medium having stored thereon data representing sequences of instructions that, when executed by a processor, cause the processor to perform operations comprising:
        detecting a context switch in a context-isolated computing environment;
        pushing a particular context-specific marker frame on a first stack only when the context switch is detected, the first stack configured to store a plurality of marker frames and wherein the particular context-specific marker frame includes context-specific information of an executing application request comprising an identification of a context of the executing application and an identification of an application through which the context was first entered;
        storing a particular link to the context-specific information on a second stack configured to store a plurality of links, each of the plurality of links comprising a pointer to at least one of the plurality of marker frames of the first stack, the second stack different than the first stack, the particular link to the context-specific information comprising a pointer to the context-specific information stored on the first stack; and
        pushing a stack frame on the second stack, the stack frame including application-specific information and not context specific information.

10. The system of claim 9, wherein the context-specific marker frame includes a bit flag and the sequences of instructions stored on the machine-readable medium causes the processor to perform operations further comprising:

setting the bit flag when the particular context-specific marker frame is created.

11. The system of claim 10, wherein the sequences of instructions stored on the machine-readable medium further causes the processor to perform operations comprising:
- popping the stack frame off of the second stack;
- analyzing the application-specific information about the executing application;
- after popping the stack frame off of the second stack, popping the particular context-specific marker frame off of the first stack; and
- analyzing the context-specific information.

12. The system of claim 10, wherein the sequences of instructions stored on the machine-readable medium further causes the processor to perform operations comprising:
- searching the first stack to locate the bit flag of the particular context-specific marker frame; and
- analyzing the context-specific information managed by the particular context-specific marker frame when the bit flag is detected.

13. The system of claim 9, wherein the application-specific information comprises a currently executing application on a processing thread.

14. The system of claim 9 wherein the machine-readable media and processor are located within a smart card computing system.

* * * * *